(12) United States Patent
Asai et al.

(10) Patent No.: US 11,247,732 B2
(45) Date of Patent: Feb. 15, 2022

(54) SUSPENSION SUPPORT BRACKET AND METHOD FOR MANUFACTURING SUSPENSION SUPPORT BRACKET

(71) Applicant: Toyota Jidosha Kabushiki Kaisha, Toyota (JP)

(72) Inventors: Tetsuya Asai, Miyoshi (JP); Ryuichi Okumoto, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 123 days.

(21) Appl. No.: 16/519,501

(22) Filed: Jul. 23, 2019

(65) Prior Publication Data

US 2020/0079435 A1 Mar. 12, 2020

(30) Foreign Application Priority Data

Sep. 12, 2018 (JP) .............................. JP2018-170891

(51) Int. Cl.
*B62D 25/08* (2006.01)
*B60G 15/06* (2006.01)
(Continued)

(52) U.S. Cl.
CPC ............. *B62D 25/088* (2013.01); *B21D 1/02* (2013.01); *B21D 1/06* (2013.01); *B21D 5/00* (2013.01); *B21D 28/00* (2013.01); *B21D 43/00* (2013.01); *B21D 53/88* (2013.01); *B60G 15/067* (2013.01); *B60G 2204/128* (2013.01); *B60G 2206/722* (2013.01); *B60G 2206/811* (2013.01);
(Continued)

(58) Field of Classification Search
CPC ............. B60G 13/003; B60G 2204/43; B60G 2204/4302; B60G 2204/128; B60G 15/068; B60G 15/067; B62D 21/11; B62D 25/088
USPC .......................................... 280/788, 124.155
See application file for complete search history.

(56) References Cited

U.S. PATENT DOCUMENTS 5,024,482 A * 6/1991 Isukimi ..................... B60G 7/00
280/124.125
5,536,035 A * 7/1996 Bautz ........................ B60G 3/20
280/124.139
(Continued)

FOREIGN PATENT DOCUMENTS

CN 106029480 A 10/2016
CN 106488850 A 3/2017
(Continued)

OTHER PUBLICATIONS

Machine translation of JP-2000219147-A from espacenet.com obtained Apr. 19 (Year: 2021).*

*Primary Examiner* — Paul N Dickson
*Assistant Examiner* — Maxwell L Meshaka
(74) *Attorney, Agent, or Firm* — Dinsmore & Shohl LLP

(57) ABSTRACT

In a suspension support bracket including a bracket body including a suspension attachment portion configured such that a shock absorber of a suspension device of a vehicle is attached to the suspension attachment portion, the bracket body is constructed of a single metal plate, and thickness dimensions of a region of the suspension attachment portion of the bracket body and a periphery of the suspension attachment portion are larger than a thickness dimension of (Continued)

another region adjacent to the region of the suspension attachment portion and periphery of the suspension attachment portion.

15 Claims, 10 Drawing Sheets

(51) Int. Cl.
    *B21D 1/06*     (2006.01)
    *B21D 5/00*     (2006.01)
    *B21D 28/00*     (2006.01)
    *B21D 43/00*     (2006.01)
    *B21D 53/88*     (2006.01)
    *B21D 1/02*     (2006.01)

(52) U.S. Cl.
    CPC ............... *B60G 2206/8102* (2013.01); *B60G 2206/8103* (2013.01)

(56) References Cited

U.S. PATENT DOCUMENTS

| | | | | |
|---|---|---|---|---|
| 6,135,498 | A * | 10/2000 | Vlahovic | B60G 15/068 280/788 |
| 6,398,236 | B1 * | 6/2002 | Richardson | B60G 11/30 280/124.157 |
| 6,434,907 | B1 * | 8/2002 | Simboli | B62D 24/02 296/146.6 |
| 9,987,895 | B2 * | 6/2018 | Amemiya | B62D 25/088 |
| 2010/0194145 | A1 * | 8/2010 | Akaki | B62D 21/02 296/187.08 |
| 2012/0306234 | A1 * | 12/2012 | Akaki | B62D 25/088 296/187.03 |
| 2012/0313360 | A1 * | 12/2012 | Akaki | B62D 21/152 280/784 |
| 2013/0087984 | A1 * | 4/2013 | Gottschalk | B60G 17/0272 280/124.116 |
| 2016/0016449 | A1 * | 1/2016 | Noble | B60G 9/02 280/86.75 |
| 2016/0355064 | A1 | 12/2016 | Amemiya | |
| 2018/0029643 | A1 * | 2/2018 | Maruyama | B62D 21/11 |

FOREIGN PATENT DOCUMENTS

| | | |
|---|---|---|
| CN | 107107162 A | 8/2017 |
| CN | 107662650 A | 2/2018 |
| JP | 2000219147 A * | 8/2000 |
| JP | 2018-039327 A | 3/2018 |
| WO | 2016/010645 A1 | 1/2016 |
| WO | 2016/100047 A1 | 6/2016 |

\* cited by examiner

SMALL ⟷ LARGE
STRESS

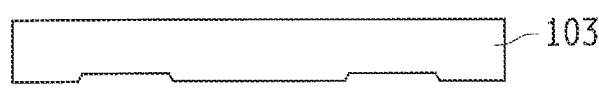
FIG. 9A
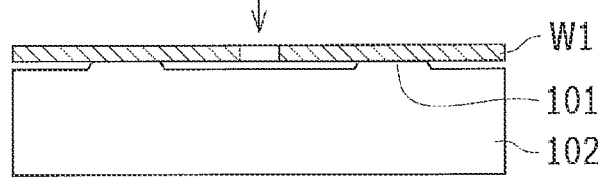
FIG. 9B
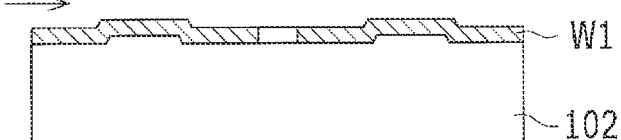
FIG. 9C
FIG. 9D
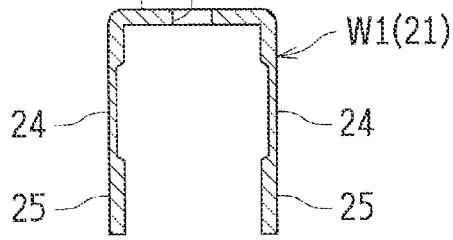

SUSPENSION SUPPORT BRACKET AND METHOD FOR MANUFACTURING SUSPENSION SUPPORT BRACKET

CROSS-REFERENCE TO RELATED APPLICATIONS

This application claims priority to Japanese Patent Application No. 2018-170891 filed on Sep. 12, 2018, which is incorporated herein by reference in its entirety including the specification, drawings and abstract.

BACKGROUND

1. Technical Field

The present disclosure relates to a suspension support bracket of a vehicle body and a method for manufacturing the suspension support bracket. In particular, the present disclosure relates to an improvement in a suspension support bracket having a plurality of regions with different thickness dimensions.

2. Description of Related Art

As disclosed in Japanese Patent Application Publication No. 2018-39327, front suspension support brackets for supporting front suspension devices (hereinafter referred to simply as suspension support brackets) are joined to a pair of right and left side rails (referred to also as side frames) by means of welding or the like. The side rails extend along a fore-and-aft direction of a vehicle body as body frames of a vehicle. In general, the suspension support bracket is constructed by forming a metal plate (such as a high tensile strength steel plate) into a predetermined shape by pressing or the like.

SUMMARY

When the suspension support bracket is manufactured by pressing the metal plate (metal plate with a uniform thickness dimension), the thickness dimension is uniform over the entire suspension support bracket. The thickness dimension is defined so that a sufficient strength can be secured at a part of the suspension support bracket where a particularly large load is applied. Therefore, the thickness dimension is unnecessarily large at the other part (part where a relatively small load is applied). Thus, there is a limit to weight reduction of the vehicle body through weight reduction of the suspension support bracket.

As a structure for reducing the weight of the suspension support bracket, it is conceivable that the suspension support bracket is constructed by integrally welding a plurality of panel members with different thickness dimensions. For example, as illustrated in FIG. 11, a suspension support bracket "a" is constructed of a bracket body "b" and a reinforcement "c". The bracket body "b" is manufactured by welding a plurality of panel members b1, b2, b2, b3, and b3 with different thickness dimensions. The bracket body "b" and the reinforcement "c" are integrated by welding. FIG. 11 illustrates a case where the bracket body "b" is constructed of an upper panel member b1, center panel members b2 and b2, and lower panel members b3 and b3.

The upper panel member b1 is provided with an attachment portion for a coil spring and a shock absorber of a suspension device (not illustrated). The lower panel members b3 and b3 are joined to a side rail (not illustrated). Therefore, a relatively large stress is generated in the upper panel member b1 and the lower panel members b3 and b3 due to a load from the suspension device. In this structure, the thickness dimensions of the upper panel member b1 and the lower panel members b3 and b3 are set larger than those of the center panel members b2 and b2. That is, the thickness dimensions of the center panel members b2 and b2 where a relatively small load is applied are reduced, whereby the weight of the suspension support bracket "a" can be reduced while obtaining a sufficient rigidity against the load.

In the case of constructing the suspension support bracket "a" as described above, however, the structure may be complicated due to an increase in the number of components. Further, an increase in manufacturing cost, a heat problem at the welded portions (decrease in the strengths of the welded portions), and formation of rust (formation of rust on the periphery of the welded portions) may occur due to the need for welding of a plurality of portions. Still further, there is a limit to reduction of the thickness dimensions (thickness dimensions of the center panel members b2 and b2) because the strengths of the welded portions (joined portions) decrease (the strengths decrease as compared to a case where the split structure is not employed). As a result, there is a limit to weight reduction of the suspension support bracket "a".

The present disclosure provides a suspension support bracket in which the weight can be reduced while simplifying the structure and reducing the number of welded portions by reducing the number of components, and also provides a method tor manufacturing the suspension support bracket.

A first aspect of the present disclosure relates to a suspension support bracket including a bracket body including a suspension attachment portion configured such that a shock absorber of a suspension device of a vehicle is attached to the suspension attachment portion. The bracket body is constructed of a single metal plate. Thickness dimensions of a region of the suspension attachment portion of the bracket body and a periphery of the suspension attachment portion are larger than a thickness dimension of another region adjacent to the region of the suspension attachment portion and periphery of the suspension attachment portion.

According to the first aspect, a thick plate portion with a large thickness dimension and a thin plate portion with a small thickness dimension are provided on the bracket body constructed of the single metal plate. That is, the region of the suspension attachment portion of the bracket body and the periphery of the suspension attachment portion where a particularly large load is applied in the suspension support bracket can be formed as the thick plate portion, and the adjacent region where a relatively small load is applied can be formed as the thin plate portion. Accordingly, thickness dimensions adjusted to the load to be applied can be obtained on the single metal plate. As a result, the region whose thickness dimension is unnecessarily large can be reduced, and the weight of the suspension support bracket can be reduced. Further, there is no need to integrally weld a plurality of panel members with different thickness dimensions (no need to employ the structure illustrated in FIG. 11). Therefore, the number of components can be reduced. Thus, it is possible to reduce the manufacturing cost, suppress the heat problem, and suppress the formation of rust by simplifying the structure and reducing the number of welded portions.

A second aspect of the present disclosure relates to a suspension support bracket including a bracket body configured to support a suspension device of a vehicle. The bracket body includes a side rail joining portion to be joined to a side rail extending along a fore-and-aft direction of a vehicle body. The bracket body is constructed of a single metal plate. Thickness dimensions of a region of the side rail joining portion of the bracket body and a periphery of the side rail joining portion are larger than a thickness dimension of another region adjacent to the region of the side rail joining portion of the bracket body and the periphery of the side rail joining portion.

According to the second aspect as well, a thick plate portion with a large thickness dimension and a thin plate portion with a small thickness dimension are provided on the bracket body constructed of the single metal plate. That is, the region of the side rail joining portion of the bracket body and the periphery of the side rail joining portion where a particularly large load is applied in the suspension support bracket can be formed as the thick plate portion, and the adjacent region where a relatively small load is applied can be formed as the thin plate portion. Accordingly, thickness dimensions adjusted to the load to be applied can be obtained on the single metal plate. As a result, the weight of the suspension support bracket can be reduced, and the number of components can be reduced similarly to the aspect described above. Thus, it is possible to reduce the manufacturing cost, suppress the heat problem, and suppress the formation of rust by simplifying the structure and reducing the number of welded portions.

A third aspect of the present disclosure relates to a suspension support bracket including a bracket body including an upper arm support portion configured to support an upper arm of a suspension device of a vehicle. The bracket body is constructed of a single metal plate. Thickness dimensions of a region of the upper arm support portion of the bracket body and a periphery of the upper arm support portion are larger than a thickness dimension of another region adjacent to the region of the upper arm support portion of the bracket body and the periphery of the upper arm support portion.

According to the third aspect as well, a thick plate portion with a large thickness dimension and a thin plate portion with a small thickness dimension are provided on the bracket body constructed of the single metal plate. That is, the region of the upper arm support portion of the bracket body and the periphery of the upper arm support portion where a particularly large load is applied in the suspension support bracket can be formed as the thick plate portion, and the adjacent region where a relatively small load is applied (for example, a center portion of the bracket body) can be formed as the thin plate portion. Accordingly, thickness dimensions adjusted to the load to be applied can be obtained on the single metal plate. As a result, the weight of the suspension support bracket can be reduced, and the number of components can be reduced similarly to the aspects described above. Thus, it is possible to reduce the manufacturing cost, suppress the heat problem, and suppress the formation of rust by simplifying the structure and reducing the number of welded portions.

A fourth aspect of the present disclosure relates to a suspension support bracket including a bracket body including a suspension attachment portion configured such that a shock absorber of a suspension device of a vehicle is attached to the suspension attachment portion, and an upper arm support portion configured to support an upper arm of the suspension device. The bracket body is constructed of a single metal plate. Thickness dimensions of a region of the suspension attachment portion of the bracket body and a periphery of the suspension attachment portion are larger than thickness dimensions of a region of the upper arm support portion of the bracket body and a periphery of the upper arm support portion. The thickness dimensions of the region of the upper arm support portion and the periphery of the upper arm support portion are larger than a thickness dimension of another region adjacent to the region of the upper arm support portion and the periphery of the upper arm support portion.

According to the fourth aspect, at least three types of thickness dimension can be obtained on the single metal plate depending on the magnitude of the load to be applied. Thus, the weight of the suspension support bracket can further be reduced.

In the aspects described above, the bracket body may include a stepped portion on one surface of the bracket body. The bracket body may include a cutting mark portion on the other surface of the bracket body, which is a surface opposite to a region recessed by the stepped portion. The bracket body may include a thick plate portion on one side in an extending direction of the bracket body across the stepped portion, and a thin plate portion on the other side in the extending direction of the bracket body across the stepped portion.

That is, the thick plate portion (shallowly recessed portion on the one surface) and the thin plate portion (deeply recessed portion on the one surface) can be provided on the bracket body constructed of the single metal plate by providing the stepped portion on the one surface of the bracket body and providing the cutting mark portion on the other surface.

In the aspects described above, the bracket body may be bent so as to have an outer surface and an inner surface. The one surface of the bracket body where the stepped portion is provided may be the inner surface. The other surface of the bracket body where the cutting mark portion is provided may be the outer surface.

When an external force is applied to the bracket body of the suspension support bracket, a tensile stress is generated in the outer surface. If a stepped portion is present on the outer surface, the stress may concentrate on this stepped portion. In view of this point, the stepped portion is provided on the inner surface (one surface), and the outer surface (other surface) is made substantially flat with the cutting mark portion. Therefore, the concentration of the tensile stress on the outer surface is prevented. Thus, the reliability of the strength of the suspension support bracket can be increased.

The present disclosure also relates to a method for manufacturing a suspension support bracket.

A fifth aspect of the present disclosure relates to a method for manufacturing a suspension support bracket. The suspension support bracket includes a suspension attachment portion configured such that a shock absorber of a suspension device of a vehicle is attached to the suspension attachment portion. The suspension support bracket is constructed of a metal plate. The method includes: pressing a metal plate serving as a bracket body of the suspension support bracket so that a recessed portion is formed on one surface of a region adjacent to a region serving as the suspension attachment portion and a projecting portion is formed on the other surface of the region adjacent to the region serving as the suspension attachment portion; shaving the metal plate after the pressing so as to form a cutting mark portion by cutting the projecting portion of the other surface of the metal plate; and bending the metal plate into a predetermined sectional shape after the shaving.

A sixth aspect of the present disclosure relates to a method for manufacturing a suspension support bracket. The suspension support bracket is configured to support a suspension device of a vehicle, and includes a side rail joining portion to be joined to a side rail extending along a fore-and-aft direction of a vehicle body. The method includes: pressing a metal plate serving as a bracket body of the suspension support bracket so that a recessed portion is formed on one surface of a region adjacent to a region serving as the side rail joining portion and a projecting portion is formed on the other surface of the region adjacent to the region serving as the side rail joining portion; shaving the metal plate after the pressing so as to form a cutting mark portion by cutting the projecting portion of the other surface of the metal plate; and bending the metal plate into a predetermined sectional shape after the shaving.

A seventh aspect of the present disclosure relates to a method for manufacturing a suspension support bracket. The suspension support bracket is configured to support an upper arm of a suspension device of a vehicle. The method includes: pressing a metal plate serving as a bracket body of the suspension support bracket so that a recessed portion is formed on one surface of a region adjacent to a region serving as an upper arm support portion and a projecting portion is formed on the other surface of the region adjacent to the region serving as the upper arm support portion; shaving the metal plate after the pressing so as to form a cutting mark portion by cutting the projecting portion of the other surface of the metal plate; and bending the metal plate into a predetermined sectional shape after the shaving.

The suspension support bracket manufactured by each of the manufacturing methods has a stepped portion at the outer edge of the recessed portion formed on the one surface by the pressing. Further, the cutting mark portion is formed by cutting the projecting portion of the other surface by the shaving. Thus, a thick plate portion is provided on one side in an extending direction of the metal plate across the stepped portion, and a thin plate portion is provided on the other side in the extending direction of the metal plate across the stepped portion.

In the suspension support bracket manufactured by each of the manufacturing methods, the region whose thickness dimension is unnecessarily large can be reduced, and the weight can be reduced as described above. Further, there is no need to integrally weld a plurality of panel members with different thickness dimensions. Therefore, the number of components can be reduced. Thus, it is possible to reduce the manufacturing cost, suppress the heat problem, and suppress the formation of rust by simplifying the structure and reducing the number of welded portions.

In the aspects of the present disclosure, the thickness dimensions of the region of the suspension attachment portion and the periphery of the suspension attachment portion, the region of the side rail joining portion and the periphery of the side rail joining portion, or the region of the upper arm support portion and the periphery of the upper arm support portion in the bracket body constructed of the single metal plate are larger than the thickness dimension of the other adjacent region. Therefore, the region whose thickness dimension is unnecessarily large can be reduced, and the weight of the suspension support bracket can be reduced. Further, there is no need to integrally weld a plurality of panel members with different thickness dimensions. Therefore, the number of components can be reduced. Thus, it is possible to reduce the manufacturing cost, suppress the heat problem, and suppress the formation of rust by simplifying the structure and reducing the number of welded portions.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 9A is a diagram for describing an overview of a manufacturing process for a bracket body of the suspension support bracket;

FIG. 9B is a diagram for describing the overview of the manufacturing process for the bracket body of the suspension support bracket:

FIG. 9C is a diagram for describing the overview of the manufacturing process for the bracket body of the suspension support bracket;

FIG. 9D is a diagram for describing the overview of the manufacturing process for the bracket body of the suspension support bracket;

DETAILED DESCRIPTION OF EMBODIMENTS

An embodiment of the present disclosure is described below with reference to the drawings. In this embodiment, description is given of a case where the present disclosure is applied to a suspension support bracket of a vehicle body frame constructed as a so-called ladder frame.

Overall Structure of Vehicle Body Frame

Figure 1:
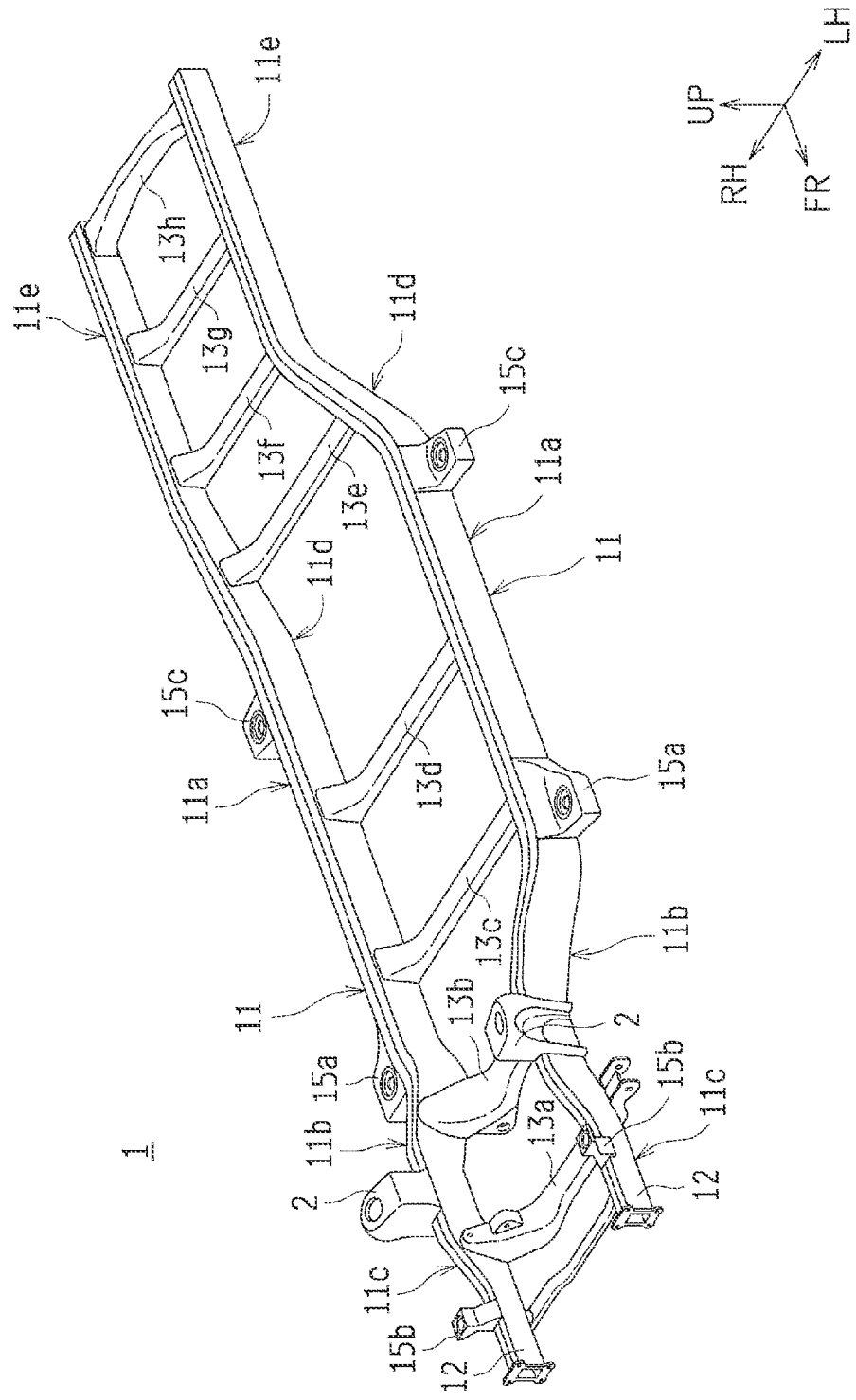
FIG. 1 is a perspective view illustrating a vehicle body frame according to a embodiment.

FIG. 1 is a perspective view illustrating a vehicle body frame 1 according to this embodiment. In FIG. 1, an arrow FR represents a forward direction of a vehicle body, an arrow UP represents an upward direction, an arrow RH represents a rightward direction of the vehicle body, and an arrow LH represents a leftward direction of the vehicle body.

As illustrated in FIG. 1, the vehicle body frame 1 includes a pair of right and left side rails 11 and 11 extending along a fore-and-aft direction of the vehicle body on both outer sides in a vehicle width direction. The side rails 11 and 11 each have a closed section structure, and include intermediate portions 11a and 11a, front kick portions 11b and 11b, front portions 11c and 11c, rear kick portions 11d and 11d, and rear portions 11e and 11e that are continuous along the fore-and-aft direction of the vehicle body, respectively.

The intermediate portion Ha horizontally extends along the fore-and-aft direction of the vehicle body in a predetermined range between an arrangement position of a front wheel (not illustrated) and an arrangement position of a rear wheel (not illustrated).

The front kick portion 11b is continuous with the front end of the intermediate portion 11a, and is shaped to curve upward with increasing proximity to a front side of the vehicle body. The front portion 11c is continuous with the front end of the front kick portion 11b, and extends toward the front side of the vehicle body. The front wheel is arranged on an outer side of the front portion 11c in the vehicle width direction. Therefore, a dimension in the vehicle width direction at the front portions 11c and 11c of the side rails 11 and 11 (dimension between the right and left front portions 11c and 11c) is shorter than a dimension in the vehicle width direction at the intermediate portions 11a and 11a (dimension between the right and left intermediate portions 11a and 11a) in consideration of interference with the front wheels. Thus, the front kick portions 11b and 11b are shaped to curve outward in the vehicle width direction with increasing proximity to a rear side of the vehicle body.

The rear kick portion 11d is continuous with the rear end of the intermediate portion 11a, and is shaped to curve upward with increasing proximity to the rear side of the vehicle body. The rear portion 11e is continuous with the rear end of the rear kick portion 11d, and extends toward the rear side of the vehicle body. The rear wheel is arranged on an outer side of the rear portion 11e in the vehicle width direction. Therefore, a dimension in the vehicle width direction at the rear portions 11e and 11e of the side rails 11 and 11 (dimension between the right and left rear portions 11e and 11e) is also shorter than the dimension in the vehicle width direction at the intermediate portions 11a and 11a (dimension between the right and left intermediate portions 11a and 11a) in consideration of interference with the rear wheels. Thus, the rear kick portions 11d and 11d are shaped to curve outward in the vehicle width direction with increasing proximity to the front side of the vehicle body.

Crash boxes 12 and 12 are provided in front of the front portions 11c and 11c of the right and left side rails 11 and 11, respectively. The crash boxes 12 and 12 absorb energy in the event of front collision of the vehicle (front collision load). A bumper reinforcement (not illustrated) extending along the vehicle width direction bridges the front ends of the pair of right and left crash boxes 12 and 12.

A plurality of cross members 13a to 13h extending along the vehicle width direction bridge the side rails 11 and 11. In FIG. 1, reference symbol 13a represents a first cross member, reference symbol 13b represents a second cross member, reference symbol 13c represents a third cross member, reference symbol 13d represents a fourth cross member, reference symbol 13e represents a fifth cross member, reference symbol 13f represents a sixth cross member, reference symbol 13g represents a seventh cross member, and reference symbol 13h represents a rear cross member.

Metal suspension support brackets (front suspension support brackets) 2 are arranged on the front portions 11c of the side rails 11 at positions between the first cross member 13a and the second cross member 13b, respectively. The suspension support brackets 2 protrude outward in the vehicle width direction.

Cab mount brackets 15a, 15b, 15c are arranged at the rear end of the front kick portion 11b of the side rail 11, at the front end of the front portion 11c of the side rail 11, and at the front end of the rear kick portion 11d of the side rail 11, respectively. The cab mount brackets 15a, 15b, 15c protrude outward in the vehicle width direction, and cab mounts (not illustrated) are attached to the cab mount brackets 15a, 15b, 15c. A cabin (not illustrated) can be coupled to the side rail 11 via the cab mounts and the cab mount brackets 15a, 15b, 15c.

Support State of Suspension Device

This embodiment has a feature in the structure of the suspension support bracket 2 that supports a suspension device. Prior to description of the structure of the suspension support bracket 2, description is given of a state in which the suspension support bracket 2 supports the suspension device.

Figure 2:
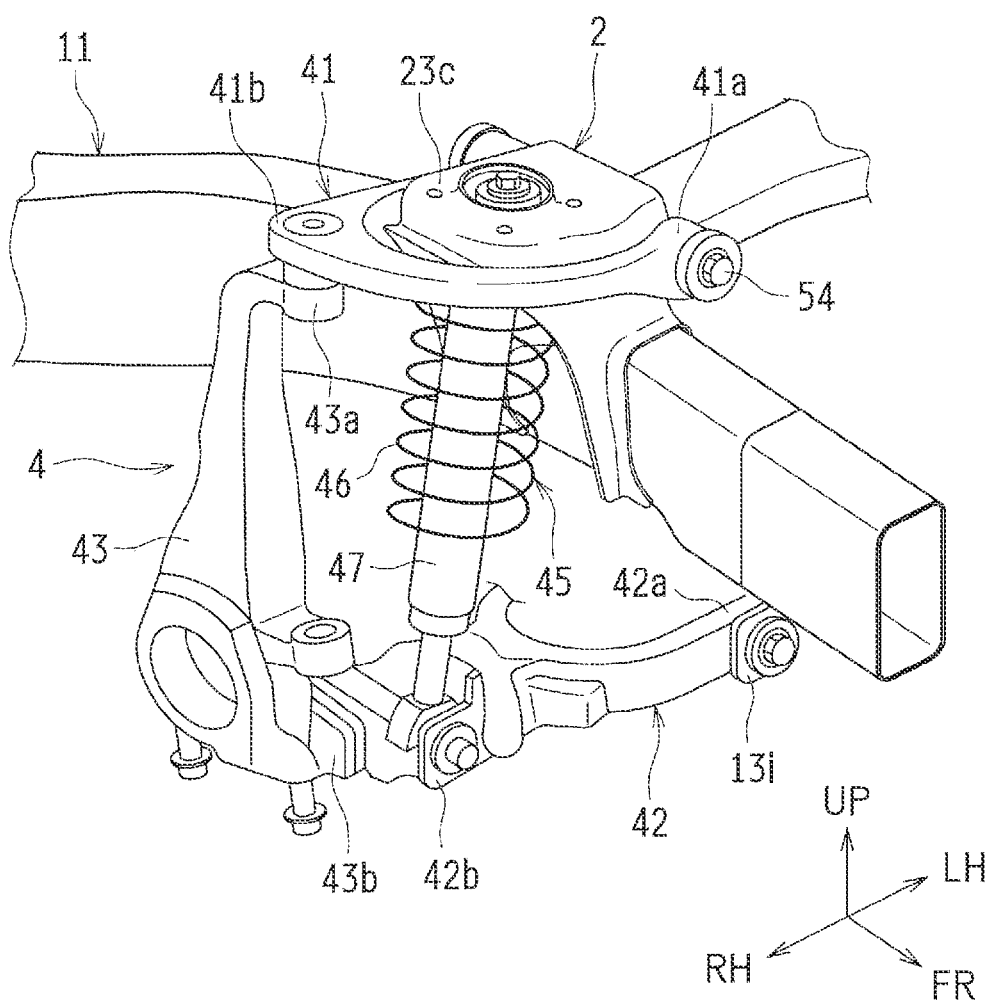
FIG. 2 is a perspective view illustrating a state in which a suspension support bracket supports a suspension device.

FIG. 2 is a perspective view illustrating a stale in which the suspension support bracket 2 supports a suspension device 4. In FIG. 2, a right front wheel portion of the vehicle is viewed from the front side of the vehicle body.

The suspension device 4 of this embodiment is a double wishbone suspension device including an upper arm 41 and a lower arm 42 extending along the vehicle width direction.

The upper arm 41 is shaped such that its inner part in the vehicle width direction branches into two segments. Proximal ends 41a on the inner side in the vehicle width direction are pivotably supported by the suspension support bracket 2 (pivotable about a pivot axis along the fore-and-aft direction of the vehicle body).

Lower arm attachment portions 13i are provided at the outer ends of the first cross member 13a and the second cross member 13b (not illustrated in FIG. 2) in the vehicle width direction, respectively. The lower arm 42 is shaped such that its inner part in the vehicle width direction branches into two segments. Proximal ends 42a on the inner side in the vehicle width direction are pivotably supported by the lower arm attachment portions 13i (pivotable about a pivot axis along the fore-and-aft direction of the vehicle body).

Upper and lower ends 43a, 43b of a knuckle 43 to which the wheel (not illustrated) is attached are coupled to distal ends 41b, 42b of the upper arm 41 and the lower arm 42 on the outer side in the vehicle width direction, respectively.

A suspension unit 45 is interposed between the suspension support bracket 2 and the lower arm 42. The suspension unit 45 includes a coil spring 46 and a shock absorber 47. The upper end of the shock absorber 47 is coupled to a suspension attachment portion 23c of the suspension support bracket 2. The lower end of the shock absorber 47 is coupled to the lower arm 42. Thus, the coil spring 46 absorbs a shock of a push-up load from a road or the like, and the shock absorber 47 damps vibration of the coil spring 46.

Structure of Suspension Support Bracket

Next, the structure of the suspension support bracket 2 is described.

Figure 3:
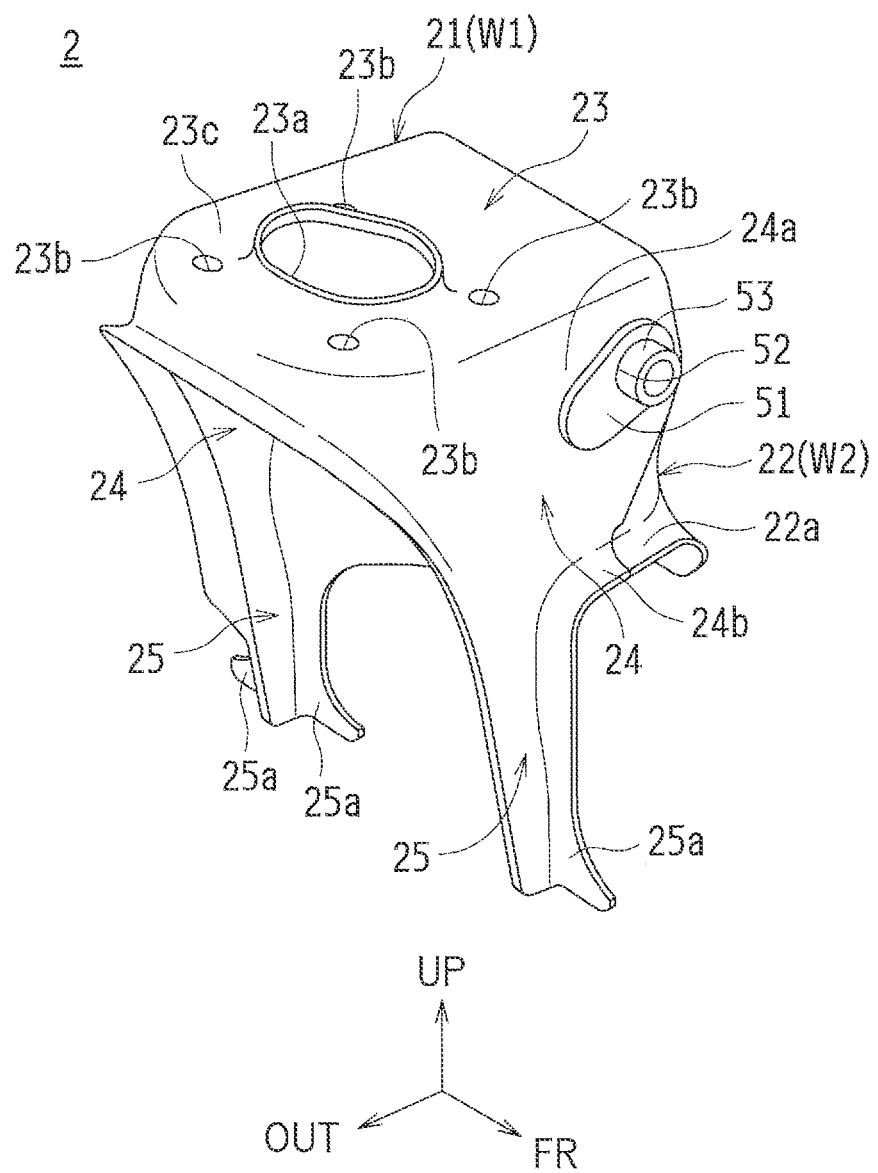
FIG. 3 is a perspective view of the suspension support bracket that is viewed from an outer side in a vehicle width direction.
Figure 4:
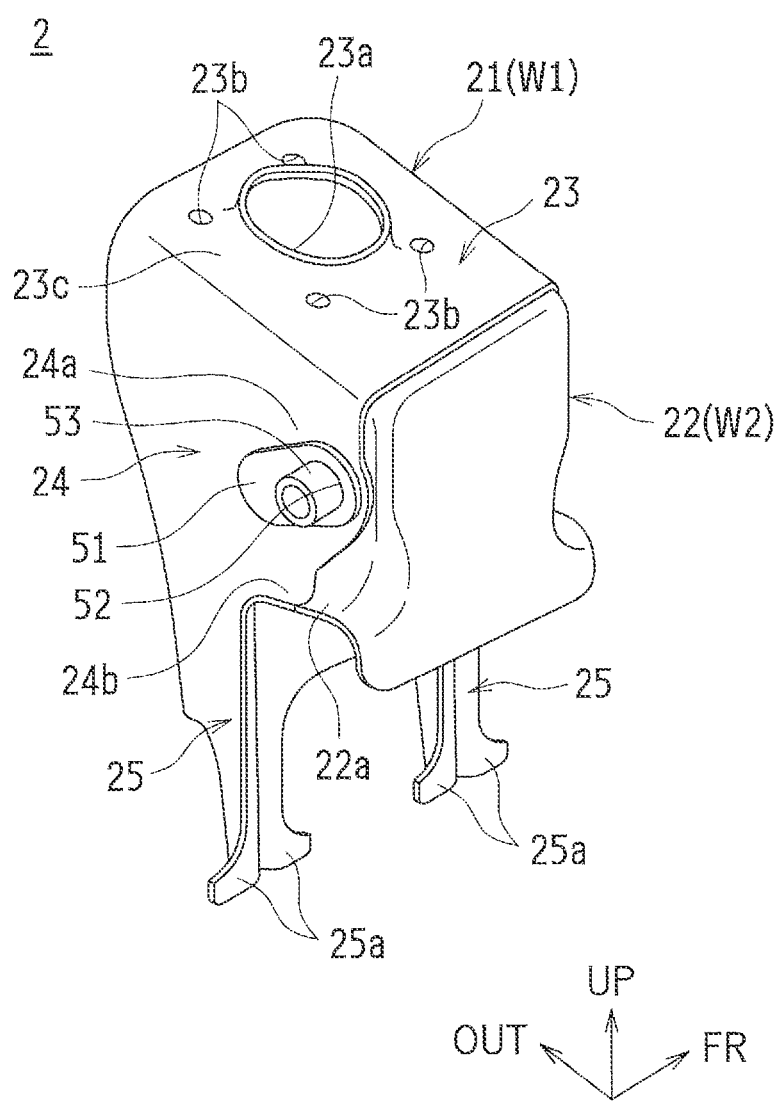
FIG. 4 is a perspective view of the suspension support bracket that is viewed from an inner side in the vehicle width direction.

FIG. 3 is a perspective view of the suspension support bracket 2 that is viewed from the outer side in the vehicle width direction. FIG. 4 is a perspective view of the suspension support bracket 2 that is viewed from the inner side in the vehicle width direction. In FIG. 3 and FIG. 4, the arrow PR represents the forward direction of the vehicle body, the arrow UP represents the upward direction, and an arrow OUT represents the outer side in the vehicle width direction.

As illustrated in FIG. 3 and FIG. 4, tire suspension support bracket 2 is constructed by welding two metal plates W1 and W2. More specifically, the suspension support bracket 2 includes a bracket body 21 and an inner cover 22. The bracket body 21 is located on the outer side in the vehicle width direction. The inner cover 22 is joined to the bracket body 21 on the inner side in the vehicle width direction. That is, the bracket body 21 is constructed of the one metal plate W1, and the inner cover 22 is constructed of the other metal plate W2. The suspension support bracket 2 is constructed by integrally welding the bracket body 21 and the inner cover 22.

The bracket body 21 includes an upper portion 23, center portions 24, and leg portions 25. The upper portion 23 is coupled to the upper end of the shock absorber 47. The center portions 24 extend downward from the lower ends of the upper portion 23 on both sides in the fore-and-aft direction of the vehicle body. The leg portions 25 extend downward from the lower ends of the center portions 24, respectively.

The upper portion 23 extends substantially along the horizontal direction, and has an opening 23a formed at its center. Bolt insertion holes 23b are formed at four positions on the periphery of the opening 23a. The upper end of the shock absorber 47 is fixed with bolts through the bolt insertion holes 23b. That is, the periphery of the opening 23a and the bolt insertion holes 23b of the upper portion 23 serves as the suspension attachment portion 23c to which the shock absorber 47 is attached by placing the upper end of the shock absorber 47 below the suspension attachment portion 23c.

A reinforcement 51 is joined to the top of an inner part of each center portion 24 in the vehicle width direction. At the portion where the reinforcement 51 is joined, through holes 52 are formed through the center portion 24 and the reinforcement 51 in the horizontal direction. An upper arm support pipe 53 is inserted through the through holes 52 of the center portion 24 and the reinforcement 51. That is, each proximal end 41a of the upper arm 41 is pivotably supported by a shaft member 54 (see FIG. 2) inserted into the upper arm support pipe 53 (pivotable about the pivot axis along the fore-and-aft direction of the vehicle body). Therefore, a part of the center portion 24 on the periphery of the through hole 52 serves as an upper arm support portion 24a according to the present disclosure. Flange portions 24b are formed at the lower edges of the center portions 24. The flange portions 24b extend to both sides in the fore-and-aft direction of the vehicle body.

The leg portions 25 are continuous with lower sides of the center portions 24, and have flange portions 25a extending to both sides in the fore-and-aft direction of the vehicle body. The flange portions 25a are continuous with the flange portions 24b formed at the lower edges of the center portions 24. The flange portions 25a of the leg portions 25 are portions for joining the leg portions 25 to the outer side surface of the side rail 11. Therefore, each flange portion 25a serves as a side rail joining portion according to the present disclosure.

The inner cover 22 is joined to the upper portion 23 and the center portions 24 of the bracket body 21 so as to cover inner parts of the upper portion 23 and the center portions 24 in the vehicle width direction. The inner cover 22 has flange portions 22a extending to both sides in the fore-and-aft direction of the vehicle body. The flange portions 22a are continuous with the flange portions 24b formed at the lower edges of the center portions 24.

Thickness Dimensions of Suspension Support Bracket

The suspension support bracket 2 has a feature in that the bracket body 21 has a plurality of regions with different thickness dimensions. This embodiment provides three types of region with different thickness dimensions. A region with the largest thickness dimension is referred to as a first region A. A region with the second largest thickness dimension is referred to as a second region B. A region with the smallest thickness dimension is referred to as a third region C.

Figure 5:
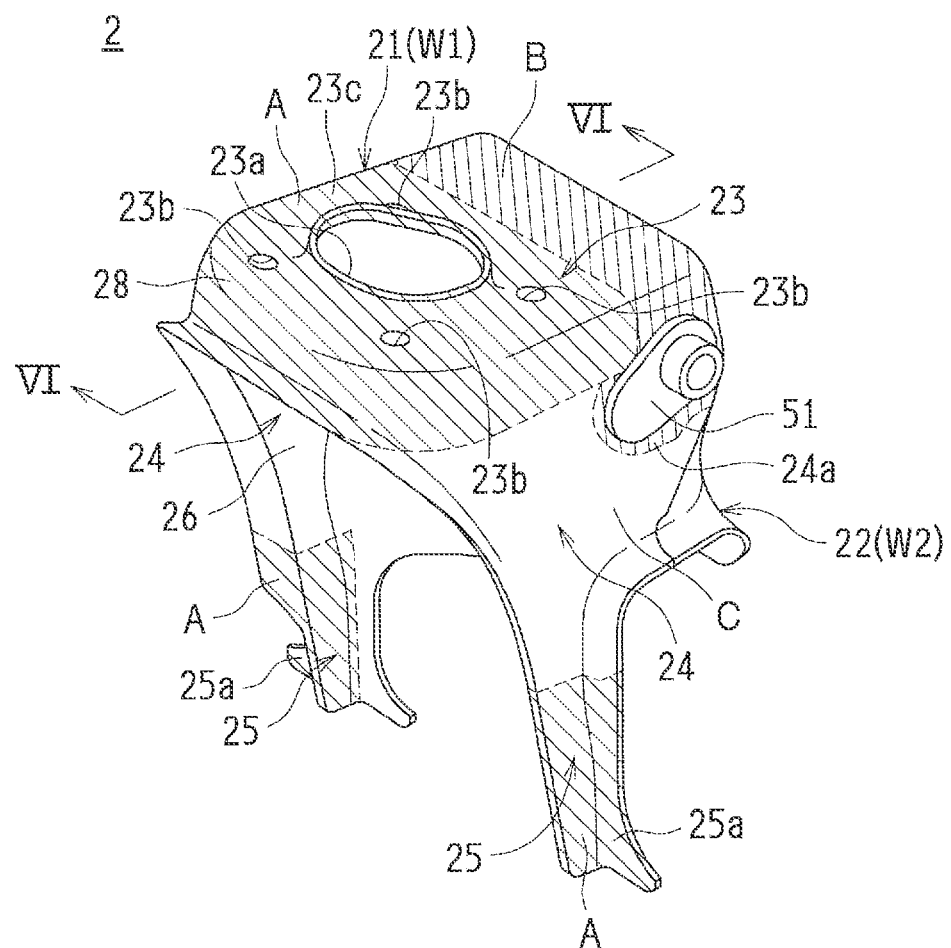
FIG. 5 is a diagram corresponding to FIG. 3, for describing thickness dimensions of respective portions of the suspension support bracket.
Figure 6:
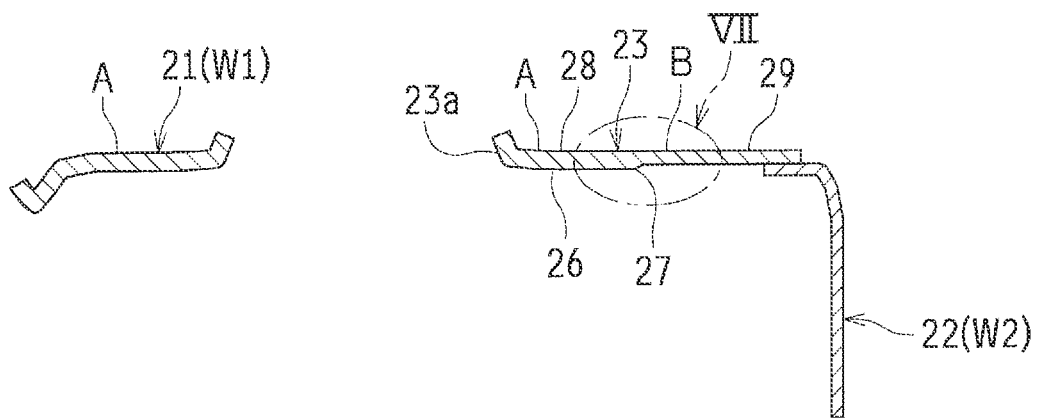
FIG. 6 is a sectional view taken along a line VI-VI in FIG. 5.
Figure 7:
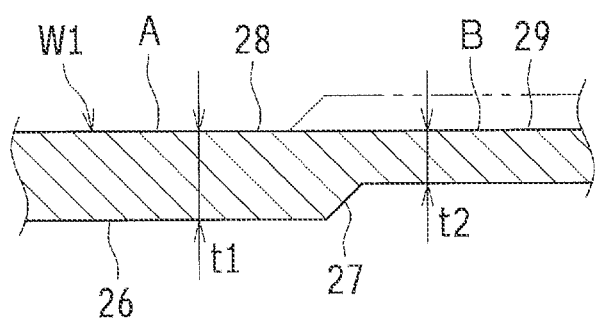
FIG. 7 is a schematic enlarged view of a portion VII in FIG. 6.

FIG. 5 is a diagram corresponding to FIG. 3, for describing thickness dimensions of respective portions of the suspension support bracket 2. FIG. 6 is a sectional view taken along a line VI-VI in FIG. 5. FIG. 7 is a schematic enlarged view of a portion VII in FIG. 6.

A specific structure for providing the plurality of regions with different thickness dimensions is as follows. As illustrated in FIG. 6 and FIG. 7, a stepped portion 27 is provided by partially recessing an inner surface 26 of the bracket body 21 (one surface of the bracket body according to the present disclosure), and an outer surface 28 (the other surface of the bracket body according to the present disclosure) is substantially flat. The plurality of regions with different thickness dimensions are formed by varying recessing dimensions of the inner surface 26. That is, the thickness dimensions are determined by dimensions between the outer surface 28 and regions recessed by the stepped portion 27 on the inner surface 26 (dimensions t1 and t2 in FIG. 7). A region with a larger recessing dimension (recessed by the stepped portion 27 more deeply) is a region with a smaller thickness dimension. Therefore, a region with a relatively large thickness dimension (thick plate portion according to the present disclosure) is located on one side in an extending direction of the bracket body 21 across the stepped portion 27 (portion shallowly recessed by the stepped portion 27), and a region with a relatively small thickness dimension (thin plate portion according to the present disclosure) is located on the other side in the extending direction of the bracket body 21 (portion deeply recessed by the stepped portion 27).

In FIG. 7, the thickness dimension differs between regions located on the right and left across the stepped portion 27. At this portion, the region located on the left across the stepped portion 27 is the thick plate portion according to the present disclosure (portion with the thickness dimension t1), and the region located on the right across the stepped portion 27 is the thin plate portion according to the present disclosure (portion with the thickness dimension t2).

As a manufacturing method for providing the stepped portion 27 by partially recessing the inner surface 26 of the bracket body 21 and for making the outer surface 28 substantially flat, pressing and shaving are performed on the metal plate W1 (metal plate serving as the bracket body 21). Although details are described later, pressing is performed so that a recessed portion is formed on one surface of the metal plate W1 (serving as the inner surface 26 of the bracket body 21) and a projecting portion is formed on the other surface (serving as the outer surface 28 of the bracket body 21) (the shape of the metal plate W1 at the end of the pressing is indicated by a hidden outline in FIG. 7). Then, shaving is performed so as to cut the projecting portion of the other surface of the metal plate W1 (serving as the outer surface 28 of the bracket body 21) (the shape of the metal plate W1 at the end of the shaving is indicated by a continuous line in FIG. 7) to make the other surface (serving as the outer surface 28 of the bracket body 21) substantially flat. That is, the stepped portion 27 is provided by leaving the recessed portion of the one surface (serving as the inner surface 26 of the bracket body 21), and the other surface (serving as the outer surface 28 of the bracket body 21) is made substantially flat by cutting the projecting portion of the other surface. Thus, the plurality of regions with different thickness dimensions as described above are formed on the single metal plate W1.

When the metal plate W1 is processed as described above, a part of the other surface (outer surface) 28 has a cutting mark portion 29 (cutting mark portion provided on the other surface 28 of the metal plate W1 that is a surface opposite to the region recessed by the stepped portion 27) along with the cutting of the projecting portion of the other surface 28 by shaving. A cut surface of the portion resulting from the cutting of the projecting portion is exposed at the cutting mark portion 29. The cutting mark portion 29 is clearly different from the other portion (uncut portion) in terms of a surface profile (such as gloss or roughness of the surface). For example, if the metal plate W1 is subjected to surface treatment, a surface treatment layer is removed. If an oxide film is present on the surface of the metal plate W1, the oxide film is removed. In some cases, an edge slightly remains on a marginal portion of the cutting mark portion 29. The cutting mark portion 29 is not necessarily flat and flush with the other portion completely, but may slightly be raised as compared to the other portion (for example, by about 0.1 mm).

In FIG. 5, the plurality of regions with different thickness dimensions are hatched for distinction. Specifically, the first region A is hatched by continuous lines inclined obliquely downward to the right. The second region B is hatched by continuous lines inclined in a direction different from that of the first region A. The third region C is not hatched. As examples of the thickness dimensions of the regions A to C, the first region A is 4.0 mm, the second region B is 3.0 mm, and the third region C is 2.5 mm. The thickness dimension of the reinforcement 51 joined to the upper arm support portion 24*a* of the center portion 24 is 3.0 mm. The thickness dimension of the inner cover 22 is 2.5 mm. The thickness dimensions are not limited to those values.

Portions Where Regions are Applied

Next, portions where the regions A to C are applied are described.

Portions where the first region A (region with the largest thickness dimension among the regions A to C) is applied are as follows: a part of the upper portion 23 on the outer side in the vehicle width direction, including the periphery of the opening 23*a* and the bolt insertion holes 23*b* (more specifically, the suspension attachment portion 23*c* corresponding to about ¾ of the upper portion 23 on the outer side in the vehicle width direction); the upper edge of each center portion 24 that is continuous with the first region A of the upper portion 23; and a part serving as each leg portion 25.

Portions where the second region B (region with the second largest thickness dimension among the regions A to C) is applied are as follows: a part of the upper portion 23 other than the first region A (more specifically, a part corresponding to about ¼ of the upper portion 23 on the inner side in the vehicle width direction); and the upper arm support portion 24*a* of each center port ion 24.

Portions where the third region C (region with the smallest thickness dimension among the regions A to C) is applied are as follows: a part of each center portion 24 other than the upper arm support portion 24*a*.

In the bracket body 21 of the suspension support bracket 2, the region of the thickness dimensions of the suspension attachment portion 23*c* and its periphery are larger than the thickness dimensions of the other adjacent regions (center portions 24). The thickness dimensions of the regions of the flange portions 25*a* of the leg portions 25 (side rail joining portions) and their peripheries are larger than the thickness dimensions of the other adjacent regions (center portions 24). The thickness dimensions of the regions the upper arm support portions 24*a* and their peripheries are larger than the thickness dimensions of the other adjacent regions (parts of the center portions 24 other than the upper arm support portions 24*a*). The thickness dimensions of the region of the suspension attachment portion 23*c* and its periphery are larger than the thickness dimensions of the regions of the upper arm support portions 24*a* and their peripheries, and the thickness dimensions of the regions of the upper arm support portions 24*a* and their peripheries are larger than the thickness dimensions of the other adjacent regions (parts of the center portions 24 other than the upper arm support portions 24*a*).

A relatively large stress is generated in the suspension attachment portion 23*c* and the flange portions 25*a* of the bracket body 21 due to a load from the suspension device 4. In this embodiment, the thickness dimensions of the suspension attachment portion 23*c* and the flange portions 25*a* where the relatively large stress is generated are larger than the thickness dimensions of the other adjacent regions. Thus, it is possible to increase the strengths of the regions where the stress is likely to increase due to the load input from the suspension device 4 in a vertical direction.

Figure 8A:
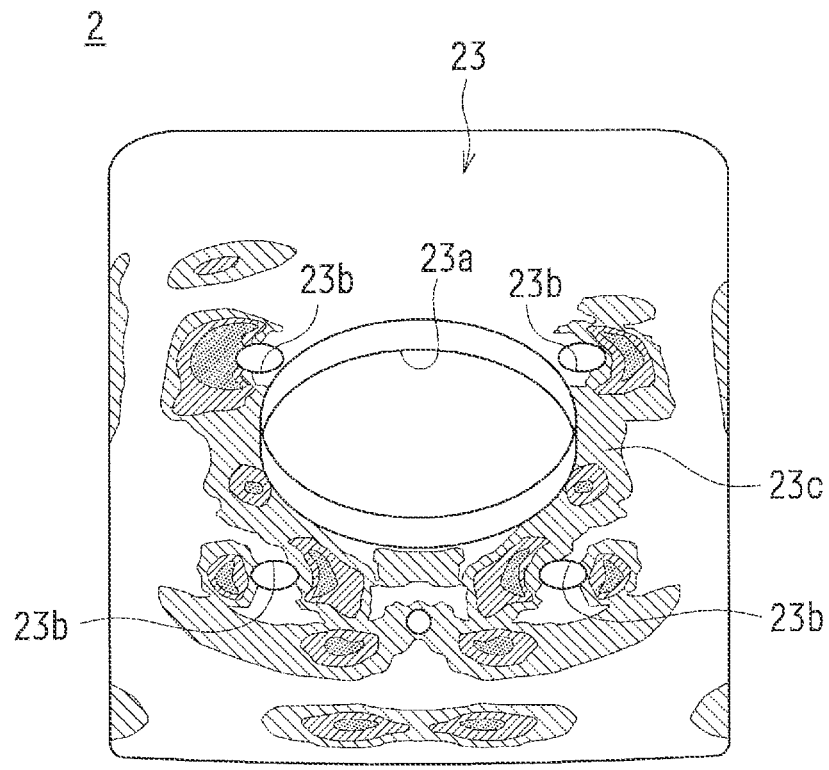
FIG. 8A is a diagram illustrating an example of stress distribution of an upper portion of the suspension support bracket.
Figure 8B:
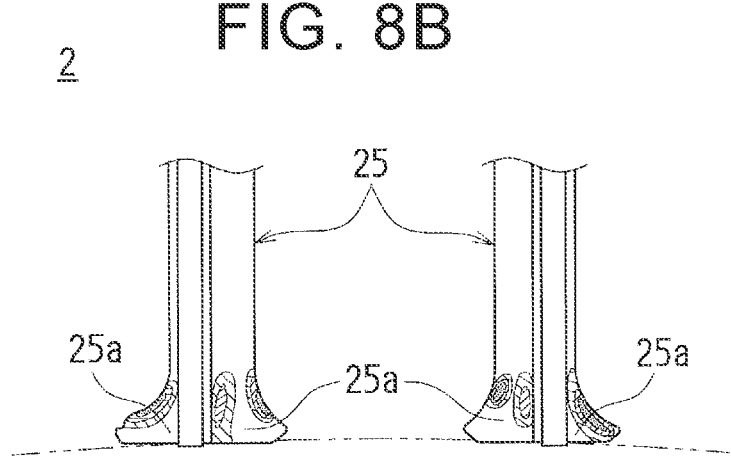
FIG. 8B is a diagram illustrating an example of stress distribution of leg portions of the suspension support bracket.

The thickness dimensions of the respective portions described above are set depending on the stress generated in the suspension support bracket 2 (bracket body 21) due to the input from the suspension device 4. FIG. 8A and FIG. 8B are diagrams illustrating examples of stress distribution of the suspension support bracket 2. FIG. 8A is a diagram illustrating stress distribution of the upper portion 23. FIG. 8B is a diagram illustrating stress distribution of the leg portions 25. As is apparent from FIG. 8A and FIG. 8B, a particularly large stress is generated on the periphery of the opening 23*a* and the bolt insertion holes 23*b* serving as the suspension attachment portion 23*c* in the upper portion 23. Further, a particularly large stress is generated in the flange portions 25*a* (side rail joining portions) of the leg portions 25. The thickness dimensions of the respective portions are set in consideration of those facts.

Manufacturing Process for Suspension Support Bracket

Next, description is given of a manufacturing process for the suspension support bracket 2 having the structure described above.

In the manufacturing process for the suspension support bracket 2, a blanking step, a pressing step, a shaving step, and a bending step for the metal plate W1 (such as a high tensile strength steel plate) and a joining step for the bracket body 21 and the inner cover 22 are performed in this order.

Figure 10A:
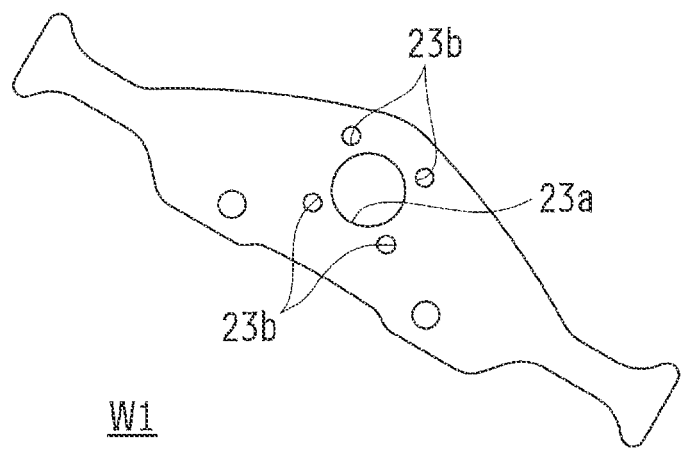
FIG. 10A is a perspective view of the bracket body in the manufacturing process, illustrating a state after blanking.
Figure 10B:
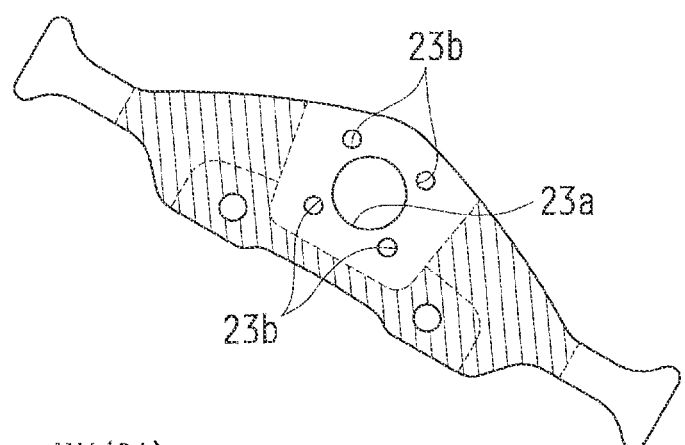
FIG. 10B is a perspective view of the bracket body in the manufacturing process, illustrating a state after shaving.
Figure 10C:
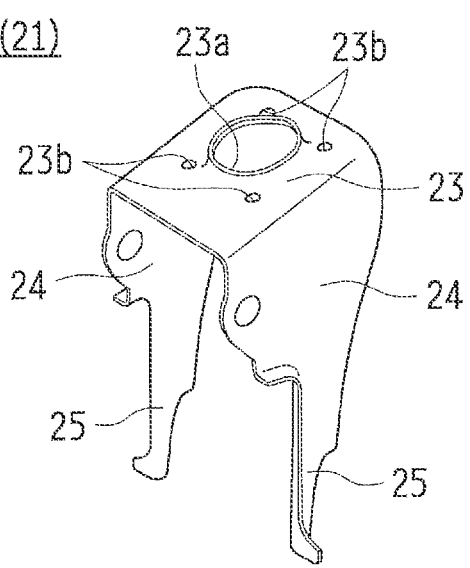
FIG. 10C is a perspective view of the bracket body in the manufacturing process, illustrating a state after bending.

FIG. 9A to FIG. 9D are diagrams for describing an overview of the manufacturing process for the bracket body 21. FIG. 10A to FIG. 10C are perspective views of the bracket body 21 (metal plate W1) in the manufacturing process.

First, a shearing machine (not illustrated) shears the metal plate W1 into a predetermined shape. FIG. 10A illustrates a state of the metal plate W1 after blanking. In the blanking, the opening 23a and the bolt insertion holes 23b are formed as well. The metal plate W1 blanked into the predetermined shape in this manner is set on a pressing machine 100 (see FIG. 9A). The pressing machine 100 includes a base 102 and a die 103. A punch 101 is mounted on top of the base 102. The die 103 is ascendible or descendible relative to the base 102. A mechanism for raising or lowering the die 103 is similar to those of related-art pressing machines, and therefore description is omitted herein.

The die 103 is lowered toward the metal plate W1 placed on the base 102 (pressing step), thereby forming a recessed portion on the lower surface of the metal plate W1 and a projecting portion on the upper surface of the metal plate W1 (see FIG. 9B). The recessed portion obtained in the pressing step will serve as the stepped portion 27.

The recessing dimension of the recessed portion is smaller than the thickness dimension of the metal plate W1. The recessing dimension of the recessed portion is set depending on a thickness dimension to be obtained in the shaving step described later (target thickness dimension). That is, a projecting dimension of a projecting portion of the punch 101 and a recessing dimension of a recessed portion of the die 103 are set so that the recessing dimension of the recessed portion decreases as the target thickness dimension increases.

Then, the pressed metal plate W1 is shaved. In the shaving, the upper surface of the metal plate W1 is cut into a substantially flat shape. Specifically, a retaining jig 200 is arranged in place of the die 103 while the pressed metal plate W1 is placed on the base 102. The lower surface of the retaining jig 200 is a flat surface. A space is present between the retaining jig 200 and the base. 102 so that a space where a shaving tool (cutter) 201 passes is secured between the retaining jig 200 and the metal plate W1. As illustrated in FIG. 9C, the cutter 201 passes through this space to remove the projecting portion of the metal plate W1 by cutting. Thus, the upper surface of the metal plate W1 is made substantially flat.

In the metal plate W1 obtained in the shaving step, the region where the projecting portion is removed by the cutler 201 is processed as the thin plate portion, and the other region is processed as the thick plate portion. FIG. 10B illustrates a stale of the metal plate W1 after the shaving. In FIG. 10B, the region where the projecting portion is removed by the shaving (cutting mark portion 29) is hatched.

To facilitate the description, FIG. 9A to FIG. 9D illustrate the case where the thick plate portion is formed at the center and both sides of the metal plate W1 and the thin plate portion is formed in the other region. As described above, the three types of region with different thickness dimensions are provided at the respective portions of the actual bracket body 21. Therefore, the punch 101 and the die 103 are manufactured so as to obtain those thickness dimensions, and the plurality of projecting portions formed in the pressing step are removed by the cutter 201. That is, the pressing step only needs to satisfy the following operations according to the present disclosure: "pressing the metal plate serving as the bracket body of the suspension support bracket so that the recessed portion is formed on one surface of the region adjacent to the region serving as the suspension attachment portion and the projecting portion is formed on the other surface of the region adjacent to the region serving as the suspension attachment portion", "pressing the metal plate serving as the bracket body of the suspension support bracket so that the recessed portion is formed on one surface of the region adjacent to the region serving as the side rail joining portion and the projecting portion is formed on the other surface of the region adjacent to the region serving as the side rail joining portion", and "pressing the metal plate serving as the bracket body of the suspension support bracket so that the recessed portion is formed on one surface of the region adjacent to the region serving as the upper arm support portion and the projecting portion is formed on the other surface of the region adjacent to the region serving as the upper arm support portion".

FIG. 9D and FIG. 10C illustrate the bracket body 21 having the regions with different thickness dimensions as described above. The suspension support bracket 2 is manufactured by forming the bracket body 21 into a U-shape by pressing or the like (bending step) and welding the inner cover 22 to the bracket body 21 (not illustrated in FIG. 9A to FIG. 9D and FIG. 10A to FIG. 10C).

Effects of Embodiment

Figure 11:
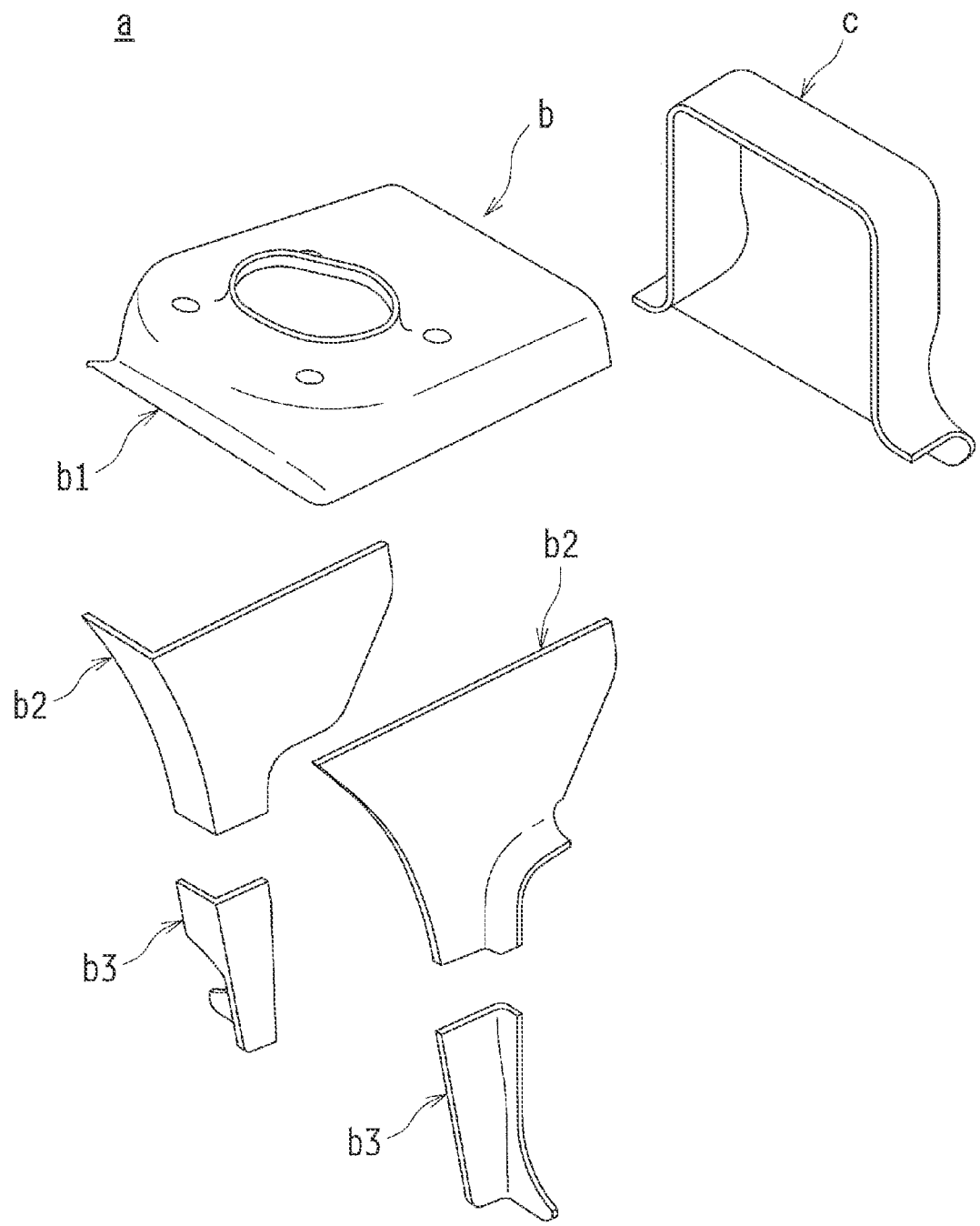
FIG. 11 is a perspective view for describing a case where the suspension support bracket is manufactured by integrally welding a plurality of panel members with different thickness dimensions.

As described above, in this embodiment, the thick plate portion and the thin plate portion are provided on the single metal plate W1 by providing the stepped portion 27 on the one surface 26 of the metal plate W1 (serving as the inner surface of the bracket body 21) and providing the cutting mark portion 29 on the other surface 28 (serving as the outer surface of the bracket body 21). By manufacturing the bracket body 21 by using the metal plate W1, the part of the bracket body 21 where a particularly large load is applied can be formed as the thick plate portion, and the part of the bracket body 21 where a relatively small load is applied can be formed as the thin plate portion. Accordingly, thickness dimensions adjusted to the load to be applied can be obtained on the single metal plate W1. Specifically, the thickness dimensions of the region of the suspension attachment portion 23c and its periphery are larger than the thickness dimensions of the other adjacent regions (center portions 24). The thickness dimensions of the regions of the flange portions 25a (side rail joining portions) and their peripheries are larger than the thickness dimensions of the other adjacent regions (center portions 24). The thickness dimensions of the regions of the upper arm support portions 24a and their peripheries are larger than the thickness dimensions of the other adjacent regions (parts of the center port ions 24 other than the upper arm support portions 24a). As a result, the region whose thickness dimension is unnecessarily large can be reduced, and the weight of the suspension support bracket 2 can be reduced. Further, there is no need to integrally weld a plurality of panel members with different thickness dimensions (no need to employ the structure illustrated in FIG. 11). Therefore, the number of components can be reduced. Thus, it is possible to reduce manufacturing cost, suppress a heat problem, and suppress formation of rust by simplifying the structure and reducing the number of welded portions.

In this embodiment, each of the bracket, body 21 and the inner cover 22 is constructed as a single member. Therefore, the suspension support bracket 2 can be constructed exclusively of the two metal plates W1 and W2. Thus, it is possible to greatly reduce the number of members for constructing the suspension support bracket 2 (number of metal plates W1 and W2 in use).

In this embodiment, the stepped portion 27 is provided on the inner surface 26 of the suspension support bracket 2 (bracket body 21), and the outer surface 28 is made substantially flat with the cutting mark portion 29. When an external force is applied to the suspension support bracket 2, a tensile stress is generated in the outer surface 28. If a stepped portion is present on the outer surface 28, the stress may concentrate on this stepped portion. In view of this point, in this embodiment, the stepped portion 27 is provided on the inner surface 26, and the outer surface 28 is made substantially flat with the cutting mark portion 29. Therefore, it is possible to prevent the concentration of the tensile stress on the outer surface 28. Thus, the reliability of the strength of the suspension support bracket 2 can be increased.

OTHER EMBODIMENTS

The present disclosure is not limited to the embodiment described above, but encompasses all modifications and applications within the scope of claims and their equivalents.

For example, in the embodiment described above, description is given of the bracket body 21 having the three types of region with different thickness dimensions. The present disclosure is not limited to this case, but may employ a bracket body having two types of region with different thickness dimensions, or a bracket body having four or more types of region with different thickness dimensions. Further, the portions where the respective regions are arranged and the shapes of the regions are not limited to those of the embodiment described above, but may be set as appropriate.

In the embodiment described above, the surface of the metal plate W1 where the stepped portion 27 is provided is the inner surface of the suspension support bracket 2, and the flat surface is the outer surface of the suspension support bracket 2. The present disclosure is not limited to this case. The surface of the metal plate where the stepped portion is provided may be the outer surface of the suspension support bracket, and the flat surface may be the inner surface of the suspension support bracket.

The present disclosure may use a metal 3D printer (such as a powder bed type or a metal deposition type) as a device for manufacturing the suspension support bracket 2 having the structure described above.

The present disclosure is applicable to a suspension support bracket and a method for manufacturing the suspension support bracket, which are applied to a vehicle body frame having a frame structure.

What is claimed is:

1. A suspension support bracket, comprising a bracket body including a suspension attachment portion configured such that a shock absorber of a suspension device of a vehicle is attached to the suspension attachment portion, wherein: the suspension attachment portion is substantially flat; the bracket body is constructed of a single metal plate and thickness dimensions of a region of the suspension attachment portion of the bracket body and a periphery of the suspension attachment portion are larger than a thickness dimension of another region adjacent to the region of the suspension attachment portion of the bracket body and the periphery of the suspension attachment portion.

2. The suspension support bracket according to claim 1, wherein:
the bracket body includes a stepped portion on one surface of the bracket body;
the bracket body includes a cutting mark portion on another surface of the bracket body, which is a surface opposite to a region recessed by the stepped portion; and
the bracket body includes a thick plate portion on one side in an extending direction of the bracket body across the stepped portion, and a thin plate portion on another side in the extending direction of the bracket body across the stepped portion.

3. The suspension support bracket according to claim 2, wherein:
the bracket body is bent so as to have an outer surface and an inner surface;
the one surface of the bracket body where the stepped portion is provided is the inner surface; and
the other surface of the bracket body where the cutting mark portion is provided is the outer surface.

4. A suspension support bracket, comprising a bracket body configured to support a suspension device of a vehicle, wherein:
the bracket body includes a side rail joining portion to be joined to a side rail extending along a fore-and-aft direction of a vehicle body;
the bracket body is constructed of a single layer having an inner surface and an opposite outer surface; and
thickness dimensions of a region of the side rail joining portion of the bracket body and a periphery of the side rail joining portion are larger than a thickness dimension of another region adjacent to the region of the side rail joining portion of the bracket body and the periphery of the side rail joining portion, the thickness dimensions are defined by a distance between the inner surface of the single layer and the opposite outer surface of the single layer.

5. The suspension support bracket according to claim 4, wherein:
the bracket body includes a stepped portion on one surface of the bracket body;
the bracket body includes a cutting mark portion on another surface of the bracket body, which is a surface opposite to a region recessed by the stepped portion; and
the bracket body includes a thick plate portion on one side in an extending direction of the bracket body across the stepped portion, and a thin plate portion on another side in the extending direction of the bracket body across the stepped portion.

6. The suspension support bracket according to claim 5, wherein:
the one surface of the bracket body where the stepped portion is provided is the inner surface; and
the other surface of the bracket body where the cutting mark portion is provided is the outer surface.

7. A suspension support bracket, comprising a bracket body including an upper arm support portion configured to support an upper arm of a suspension device of a vehicle, wherein:
the bracket body is constructed of a single layer having an inner surface and an opposite outer surface; and
thickness dimensions of a region of the upper arm support portion of the bracket body and a periphery of the upper arm support portion are larger than a thickness dimension of another region adjacent to the region of the upper arm support portion of the bracket body and the periphery of the upper arm support portion, the thickness dimensions are defined by a distance between the inner surface of the single layer and the opposite outer surface of the single layer.

8. The suspension support bracket according to claim 7, wherein:
the bracket body includes a stepped portion on one surface of the bracket body;
the bracket body includes a cutting mark portion on another surface of the bracket body, which is a surface opposite to a region recessed by the stepped portion; and
the bracket body includes a thick plate portion on one side in an extending direction of the bracket body across the stepped portion, and a thin plate portion on another side in the extending direction of the bracket body across the stepped portion.

9. The suspension support bracket according to claim 8, wherein:
the one surface of the bracket body where the stepped portion is provided is the inner surface; and
the other surface of the bracket body where the cutting mark portion is provided is the outer surface.

10. A suspension support bracket, comprising a bracket body including a suspension attachment portion configured such that a shock absorber of a suspension device of a vehicle is attached to the suspension attachment portion, and an upper arm support portion configured to support an upper arm of the suspension device, wherein: the suspension attachment portion is substantially flat; the bracket body is constructed of a single metal plate; thickness dimensions of a region of the suspension attachment portion of the bracket body and a periphery of the suspension attachment portion are larger than thickness dimensions of a region of the upper arm support portion of the bracket body and a periphery of the upper arm support portion; and
the thickness dimensions of the region of the upper arm support portion and the periphery of the upper arm support portion are larger than a thickness dimension of another region adjacent to the region of the upper arm support portion and the periphery of the upper arm support portion.

11. The suspension support bracket according to claim 10, wherein:
the bracket body includes a stepped portion on one surface of the bracket body;
the bracket body includes a cutting mark portion on another surface of the bracket body, which is a surface opposite to a region recessed by the stepped portion; and
the bracket body includes a thick plate portion on one side in an extending direction of the bracket body across the stepped portion, and a thin plate portion on another side in the extending direction of the bracket body across the stepped portion.

12. The suspension support bracket according to claim 11, wherein:
the bracket body is bent so as to have an outer surface and an inner surface;
the one surface of the bracket body where the stepped portion is provided is the inner surface; and
the other surface of the bracket body where the cutting mark portion is provided is the outer surface.

13. A method for manufacturing a suspension support bracket, the suspension support bracket including a suspension attachment portion configured such that a shock absorber of a suspension device of a vehicle is attached to the suspension attachment portion, the suspension support bracket being substantially flat and constructed of a single layer, the method comprising:
pressing a single layer serving as a bracket body of the suspension support bracket so that a recessed portion is formed on one surface of a region adjacent to a region serving as the suspension attachment portion and a projecting portion is formed on another surface of the region adjacent to the region serving as the suspension attachment portion;
shaving the single layer after the pressing so as to form a cutting mark portion by cutting the projecting portion of the other surface of the layer and to form thickness dimensions of a region of the suspension attachment portion of the bracket body and a periphery of the suspension attachment portion to be larger than a thickness dimension of another region adjacent to the region of the suspension attachment portion of the bracket body and the periphery of the suspension attachment portion; and
bending the single layer into a predetermined sectional shape after the shaving to form the suspension support bracket.

14. A method for manufacturing a suspension support bracket, the suspension support bracket being configured to support a suspension device of a vehicle, and including a side rail joining portion to be joined to a side rail extending along a fore-and-aft direction of a vehicle body, the method comprising:
pressing a single layer serving as a bracket body of the suspension support bracket so that a recessed portion is formed on one surface of a region adjacent to a region serving as the side rail joining portion and a projecting portion is formed on another surface of the region adjacent to the region serving as the side rail joining portion, the single layer having an inner surface and an opposite outer surface;
shaving the single layer after the pressing so as to form a cutting mark portion by cutting the projecting portion of the other surface of the single layer and to form thickness dimensions of a region of the side rail joining portion of the bracket body and a periphery of the side rail joining portion to be larger than a thickness dimension of another region adjacent to the region of the side rail joining portion of the bracket body and the periphery of the side rail joining portion, the thickness dimensions are defined by a distance between the inner surface of the single layer and the opposite outer surface of the single layer; and
bending the single layer into a predetermined sectional shape after the shaving to form the suspension support bracket.

15. A method for manufacturing a suspension support bracket, the suspension support bracket being configured to support an upper arm of a suspension device of a vehicle, the method comprising:
pressing a single layer serving as a bracket body of the suspension support bracket so that a recessed portion is formed on one surface of a region adjacent to a region serving as an upper arm support portion and a projecting portion is formed on another surface of the region adjacent to the region serving as the upper arm support portion, the single layer having an inner surface and an opposite outer surface;
shaving the single layer after the pressing so as to form a cutting mark portion by cutting the projecting portion of the other surface of the single layer and to form thickness dimensions of a region of the upper arm support portion of the bracket body and a periphery of the upper arm support portion to be larger than a thickness dimension of another region adjacent to the region of the upper arm support portion of the bracket body and the periphery of the upper arm support portion, the thickness dimensions are defined by a distance between the inner surface of the single layer and the opposite outer surface of the single layer; and
bending the single layer into a predetermined sectional shape after the shaving to form the suspension support bracket.

\* \* \* \* \*